United States Patent
Römer et al.

(10) Patent No.: US 6,810,689 B2
(45) Date of Patent: Nov. 2, 2004

(54) PROCESS FOR THE MELTING, REFINING AND HOMOGENIZING OF GLASS MELTS

(75) Inventors: Hildegard Römer, Karben (DE); Werner Kiefer, Mainz (DE); Wolfgang Schmidbauer, Mainz (DE); Thomas Pfeiffer, Ingelheim (DE); Guido Räke, Bingen (DE)

(73) Assignee: Schott Glass, Mainz (DE)

( * ) Notice: Subject to any disclaimer, the term of this patent is extended or adjusted under 35 U.S.C. 154(b) by 337 days.

(21) Appl. No.: 09/769,672

(22) Filed: Jan. 25, 2001

(65) Prior Publication Data

US 2001/0039812 A1 Nov. 15, 2001

(30) Foreign Application Priority Data

Jan. 29, 2000 (DE) .......................................... 100 03 948

(51) Int. Cl.[7] .................................................. C03B 5/44
(52) U.S. Cl. .................... 65/134.1; 65/134.9; 65/135.6; 65/374.12
(58) Field of Search .............................. 65/134.9, 134.7, 65/134.6, 390, 135.1, 135.6, 134.1, 379.12

(56) References Cited

U.S. PATENT DOCUMENTS

| | | | | |
|---|---|---|---|---|
| 805,302 A | * | 11/1905 | Kuch ........................ | 65/33.9 |
| 1,581,829 A | * | 4/1926 | Berry ........................ | 65/33.9 |
| 3,775,081 A | * | 11/1973 | Williams et al. ........... | 65/134.5 |
| 3,776,707 A | * | 12/1973 | Inoue et al. ............... | 65/29.19 |
| 3,779,733 A | * | 12/1973 | Janakirama-Rao ......... | 65/32.5 |
| 3,844,754 A | * | 10/1974 | Grubb et al. ............... | 65/30.14 |
| 3,856,497 A | * | 12/1974 | Hummel .................... | 65/33.8 |
| 3,928,014 A | * | 12/1975 | Knavish .................... | 65/29.21 |
| 4,082,528 A | * | 4/1978 | Lythgoe et al. ............ | 65/135.1 |
| 4,128,411 A | * | 12/1978 | Reisfeld et al. ............ | 65/32.5 |
| 4,138,235 A | * | 2/1979 | Turner ....................... | 65/27 |
| 4,738,938 A | * | 4/1988 | Kunkle et al. .............. | 501/72 |
| 4,744,809 A | * | 5/1988 | Pecoraro et al. ........... | 65/135.4 |
| 4,780,121 A | * | 10/1988 | Matesa ...................... | 62/134 |
| 5,464,462 A | * | 11/1995 | Langer et al. .............. | 65/66 |
| 5,509,951 A | * | 4/1996 | Baucke et al. ............. | 65/134.6 |
| 5,665,137 A | * | 9/1997 | Huang ....................... | 65/134.1 |
| 6,470,710 B1 | * | 10/2002 | Takei et al. ................ | 65/134.1 |

FOREIGN PATENT DOCUMENTS

| | | | | |
|---|---|---|---|---|
| DE | 199 39 771.6 | | 8/1999 | |
| DE | 199 39 772.4 | | 8/1999 | |
| DE | 199 39 785.6 | | 8/1999 | |
| DE | 19939771 A1 | * | 2/2001 | ............ C03C/1/00 |
| WO | WO 98/03442 | | 1/1998 | |
| WO | WO 98/18731 | | 5/1998 | |

OTHER PUBLICATIONS

Tooley.Fay. Handbook Of Glass Manufacture, Ogden Publishing Co. 1953, New York, New York., pp. 57–80 and 242–270.*

Office Action in German Patent Application No. 100 03 948.0 and English Language Translation of Office Action, Sep. 11, 2000.

* cited by examiner

*Primary Examiner*—Steven P. Griffin
*Assistant Examiner*—Carlos Lopez
(74) *Attorney, Agent, or Firm*—Baker & Daniels

(57) ABSTRACT

The invention relates to a process for the production of a glass melt.

For the avoidance of the oxygen reboil the process is equipped with the following process stages or steps:
   a melting stage
   a refining stage
   a homogenizing and conditioning stage;
in which before the homogenizing and conditioning stage the melt is heated to a temperature of over 1700° C.;
in which polyvalent ions are present in the melt in a proportion of at least 0.5% by wt.

17 Claims, 2 Drawing Sheets

PROCESS FOR THE MELTING, REFINING AND HOMOGENIZING OF GLASS MELTS

The invention relates to a process for the melting, refining and homogenizing of glass, There, raw materials such as silicates and a gas batch are first melted up in a tank or in a crucible. In the melting the Skull principle is being used to an increasing degree. Here, high-frequency energy is sent into the content of the crucible by means of an induction coil. The glass melt is then transferred into a refining vessel. Here too, the Skull principle is again applied. Finally, the purified glass melt passes into a homogenizing vessel. Reference is made of WO 98/18731 and to WO 98/03442.

In the homogenizing and conditioning of glass melts, platinum structural components are used. These have, to be sure, the advantage of a high resistance to corrosion. It is known, however, that oxygen bubbles occur as soon as the melt comes in contact with platinum parts. As is well known, platinum has a catalytic decomposition effect on water. Platinum is permeable to hydrogen, so that there may occur a hydrogen diffusion through the platinum. If the hydrogen content differs between the outside and the inside of the wall of a platinum structural component, then there occurs a steady hydrogen transport in one and the same direction. Since the partial pressure of the water in a glass melt is higher then the environmental partial pressure, there occurs a depositing of oxygen on the inner wall of the platinum structural component. When the solubility limit for oxygen in the melt is exceeded, a bubble formation occurs, the so-called oxygen reboil on platinum.

Attempts have already been made to suppress the reboil mentioned by countermeasures. Thus, on the outside wall of a platinum vessel a controlled hydrogen atmosphere has been provided. It has also been attempted to establish corresponding conditions in the melt itself, for example, to adjust the oxygen content of the melt in a defined manner and simultaneously to expose the melt to an oxy-fuel heating. These measures, however, require expensive apparatuses and are correspondingly costly. The problem of adjusting the water content has, furthermore, the disadvantage that with a change in the water content the product properties are altered, which is undesired.

Underlying the invention is the problem of designing a process for the melting, refining and homogenizing of glass, in such manner that also with use of platinum structural components the oxygen reboil mentioned is avoided.

The problem is solved by the features of claim 1.

The inventors have perceived the following:

The oxygen reboil tendency of a glass melt decreases if the temperature of the melt is raised to a certain minimum level on the way to the homogenizing station and if, furthermore, polyvalent ions are present in the melt. The ions can be present, for example, in the form of vanadium, cerium, zinc, tin, titanium, iron, molybdenum, or europium. The temperature of the melt should be higher than 1700° C., and better still, higher than 2400° C.

The inventors have perceived in detail the following: the ions are reduced at the high melting or refining temperatures mentioned. Thus, for example $V^{5+}$ at temperatures around 2200° C. goes over into $V^{3+}$. $Ti^{3+}$ becomes $Ti^{2+}$. It is not disadvantageous for the temperature to be lower in a homogenizing or conditioning process. Here the higher valency state of the polyvalent ions remains stable. In order to reach the higher valency state, the ion needs oxygen which normally is not present in fully refined melt. If a water decomposition occurs when the melt comes in contact with a platinum structural component, to be sure, oxygen is generated. This, however, does not lead to reboil bubble formation. On the contrary, the oxygen is buffered off from the polyvalent ions present in the reduced state.

A great advantage of the inventive process of the invention lies in that the supplying of toxic refining agents such as arsenic oxide or antimony oxide is not necessary. This on the one hand lowers the costs and, on the other hand, reduces the known risks.

In one form thereof, the present invention provides a process for producing a glass melt, including the steps of melting glass in a first stage; refining the melt in a second stage, the melt having a polyvalent ion content of at least 0.5 wt. %, with at least one of said melting and refining steps conducted at a temperature of at least 1800° C.; and homogenizing and conditioning the glass in a third stage. In a further form, at least one of said melting and refining steps is conducted at a temperature of between 2100° C. and 2400° C. and above.

The invention is explained with the aid of the drawing. In the latter, there is shown in detail the following:

Figure 1:
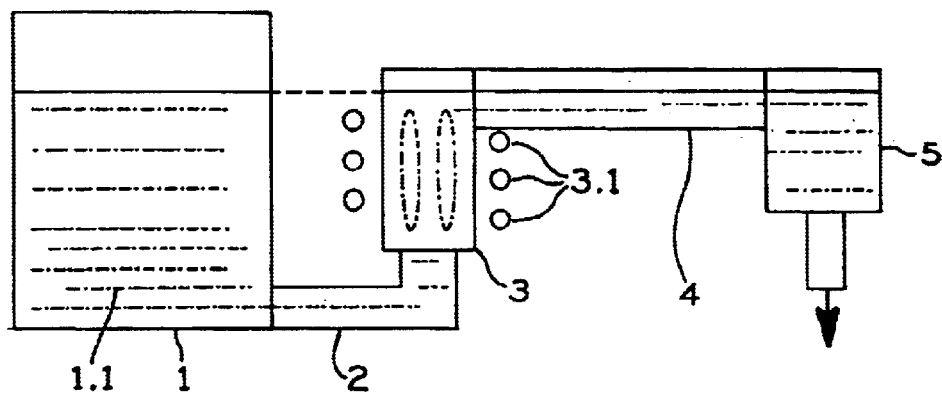
FIG. 1 depicts an installation for the melting of glass as well as for the refining and for the homogenizing and conditioning of the melt.

The installation shown in FIG. 1 comprises a melting tank 1, a refining crucible 3 as well as a crucible 5 for homogenizing and conditioning.

The melt 1.1 extracted in the melting tank 1 flows over an overflow channel 2 to the refining crucible 3. The latter is constructed according to the Skull principle and comprises a high-frequency induction coil 3.1. After the refining, the melt passes from the refining crucible 3 over a quieting stretch 4 to the platinum crucible 5. The platinum crucible 5 is provided with a platinum agitator (not shown here), and further with a likewise not shown resistance-heated platinum tube.

To the glass melt no toxic refining agents were added, such as, for example, arsenic oxide or antimony oxide. Instead of this, the melt contains 1.1 polyvalent ions such as titanium, iron, vanadium, zinc or tin. The reduction of these polyvalent ions occurs in the refining crucible 3.

The temperature of the refining crucible 3 is between 1800 and 2400° C. The temperature in the platinum crucible 5, in contract, is about 1400 to 1600° C. What is important is that the melt at some point or other on its way from the melting tank 1 to the platinum crucible 5 was heated to the temperature range mentioned, from 1800 to 2400° C. or more. A temperature drop in the platinum crucible is harmless.

Figure 2:
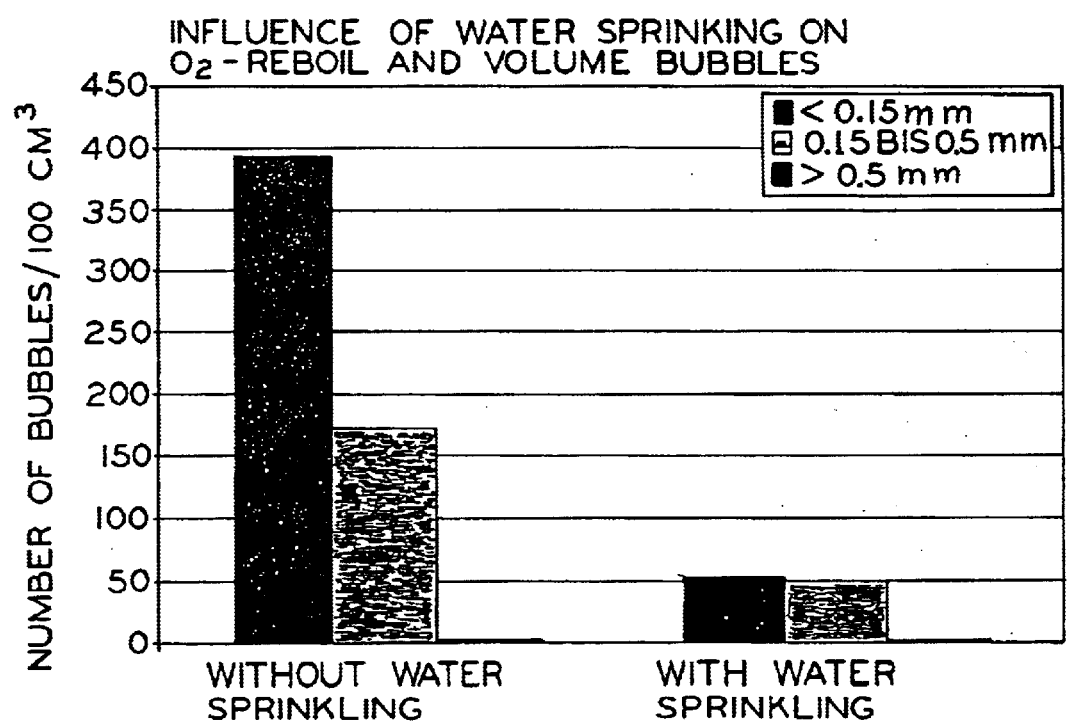
FIG. 2 is a staple diagram which illustrates the influence of water-gassing on $O_2$-reboil as well as volume bubbles.

As mentioned, at conventional melting temperatures an oxygen reboil occurs on the platinum structure components. The evidence that here it is a matter of a reboil can be proved by water-gassing of the outside space—see FIG. 2. If platinum structural components, namely, are rinsed with water from the outside, then the reboil is suppressed and the bubble formation is reduced.

If according to the invention, instead of the water-gassing a refining temperature of 1800° C. is chosen, then—in the presence of iron—a decrease of the reboil takes place. The decrease is due to the reduction of iron. The iron is present only in traces of ca 40 ppm. The buffer effect of the iron ions here is relatively slight.

Figure 3:
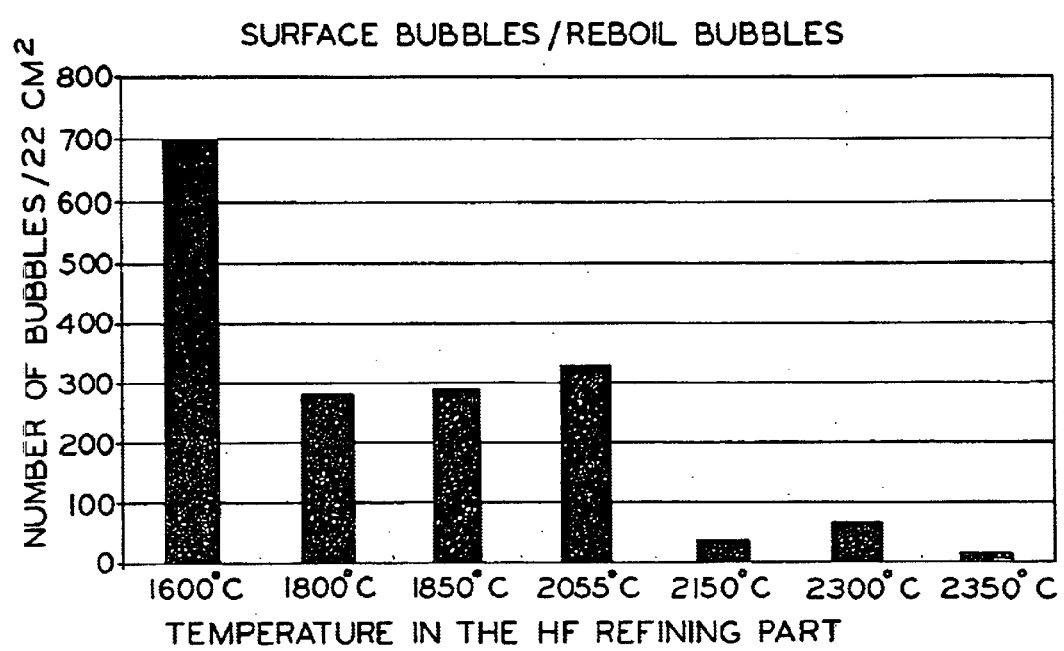
FIG. 3 is a staple diagram which shows the dependence of the reboil on the refining temperature.

The influence of a still higher refining temperature is evident from FIG. 3. If one goes to a refining temperature of over 2100° C., and polyvalent ions such as zinc and titanium are present in a corresponding amount, then it is possible to forego a water sprinkling of the outside space. The ions then act as buffers against the oxygen formation on platinum—see FIG. 3.

It has proved that there the materials mentioned must be present in the melt in an amount which lies within the percentage range.

What is claimed is:

1. A process for producing a glass melt, comprising the steps of:

melting glass in a first stage;

refining the glass melt in a second stage, the glass melt having a polyvalent ion content of at least 0.5 wt. %;

homogenizing and conditioning the glass melt in a third stage; and raising the temperature of the glass melt to at least 1700° C. prior to said homogenizing and conditioning step.

2. The process of claim 1, wherein said raising the temperature of the glass melt to at least 2400° C.

3. The process of claim 1, wherein said refining step is conducted at a temperature of between 1800° C. and 2400° C.

4. The process of claim 1, wherein said polyvalent ions comprise one or more ions selected from the group consisting of vanadium, cerium, zinc, tin, titanium, iron, molybdenum, europium, manganese, and nickel.

5. The process of claim 1, wherein said glass melt is free from toxic refining agents.

6. The process of claim 1, wherein said refining step is conducted by heating the glass melt in a crucible using an induction coil.

7. The process of claim 2, wherein said refining step is conducted at a temperature of between 1800° C. and 2400° C.

8. The process of claim 2, wherein said polyvalent ions comprise one or more ions selected from the group consisting of vanadium, cerium, zinc, tin, titanium, iron, molybdenum, europium, manganese, and nickel.

9. The process of claim 3, wherein said polyvalent ions comprise one or more ions selected from the group consisting of vanadium, cerium, zinc, tin, titanium, iron, molybdenum, europium, manganese, and nickel.

10. The process of claim 5, wherein said polyvalent ions comprise one or more ions selected from the group consisting of vanadium, cerium, zinc, tin, titanium, iron, molybdenum, europium, manganese, and nickel.

11. The process of claim 2, wherein said glass melt is free from toxic refining agents.

12. The process of claim 3, wherein said glass melt is free from toxic refining agents.

13. The process of claim 4, wherein said glass melt is free from toxic refining agents.

14. The process of claim 1, wherein said refining step is conducted by heating the melt in a crucible using an induction coil.

15. The process of claim 2, wherein said refining step is conducted by heating the glass melt in a crucible using an induction coil.

16. The process of claim 3, wherein said refining step is conducted by heating the glass melt in a crucible using an induction coil.

17. The process of claim 1, wherein the glass melt is contained in a crucible made from one of platinum and a platinum alloy in said homogenizing and conditioning step.

* * * * *

UNITED STATES PATENT AND TRADEMARK OFFICE
CERTIFICATE OF CORRECTION

PATENT NO.    : 6,810,689 B2
DATED         : November 2, 2004
INVENTOR(S)   : Hildegard Romer et al.

It is certified that error appears in the above-identified patent and that said Letters Patent is hereby corrected as shown below:

<u>Title page,</u>
Item [73], Assignee, delete "Glass" and insert therefor -- Glas --.

Signed and Sealed this

Twenty-second Day of February, 2005

JON W. DUDAS
*Director of the United States Patent and Trademark Office*